(12) United States Patent
Hirayama et al.

(10) Patent No.: US 11,866,813 B2
(45) Date of Patent: Jan. 9, 2024

(54) SPRAY COATING (71) Applicant: NISSAN MOTOR CO., LTD., Yokohama (JP)

(72) Inventors: Hayato Hirayama, Kanagawa (JP); Tsuyoshi Higuchi, Kanagawa (JP); Yoshito Utsumi, Kanagawa (JP); Hiroaki Hoshikawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/628,350

(22) PCT Filed: Mar. 23, 2021

(86) PCT No.: PCT/JP2021/011915
§ 371 (c)(1),
(2) Date: Jan. 19, 2022

(87) PCT Pub. No.: WO2021/205864
PCT Pub. Date: Oct. 14, 2021

(65) Prior Publication Data
US 2022/0282361 A1    Sep. 8, 2022

(30) Foreign Application Priority Data
Apr. 9, 2020   (JP) .................. 2020-070339

(51) Int. Cl.
*C22C 38/44*     (2006.01)
*C22C 38/02*     (2006.01)
(Continued)

(52) U.S. Cl.
CPC ............ *C22C 38/44* (2013.01); *B32B 15/012* (2013.01); *C22C 38/02* (2013.01); *C22C 38/04* (2013.01); *C23C 4/10* (2013.01); *C23C 4/131* (2016.01)

(58) Field of Classification Search
None
See application file for complete search history.

(56) References Cited

U.S. PATENT DOCUMENTS

| 9,988,701 B2 | 6/2018 | Oezdeniz et al. |
| 2010/0108014 A1 | 5/2010 | Kodama et al. |
| (Continued) | | |

FOREIGN PATENT DOCUMENTS

| EP | 2664684 A2 * | 11/2013 | ......... B23K 35/0261 |
| JP | 2008-240029 A | 10/2008 | |
| (Continued) | | | |

*Primary Examiner* — Xiaobei Wang
(74) *Attorney, Agent, or Firm* — Foley & Lardner LLP (57) ABSTRACT

Provided is a spray coating that is disposed on an inner peripheral surface of a cylinder bore of a cylinder block made of aluminum or an aluminum alloy. The spray coating contains 0.005% to 0.14% by mass of carbon, 0.01% to 3.0% by mass of nickel 10% to 20.5% by mass of chromium, 0.05% to 1.5% by mass of silicon, and a balance containing iron and inevitable impurities. The spray coating has a composition that forms a martensite+ferrite (M+F) region in the Schaeffler diagram, and a composition in which a nickel equivalent (NiE) and a chromium equivalent (CrE) satisfy a relationship expressed by the following Formulae (1): NiE≤0.95 CrE−8.59, (2): NiE≤4.1, and (3): CrE≥10. The spray coating has a two-phase structure formed of a martensite phase and a ferrite phase.

10 Claims, 2 Drawing Sheets

(51) Int. Cl.
    *C22C 38/04*     (2006.01)
    *B32B 15/01*     (2006.01)
    *C23C 4/131*     (2016.01)
    *C23C 4/10*     (2016.01)

(56) References Cited

U.S. PATENT DOCUMENTS

| | | |
|---|---|---|
| 2012/0121451 A1 | 5/2012 | Kodama et al. |
| 2014/0186540 A1* | 7/2014 | Schramm .............. B05B 7/0075 427/449 |
| 2015/0152539 A1 | 6/2015 | Oezdeniz et al. |
| 2020/0109465 A1* | 4/2020 | Cao ........................ C23C 24/04 |

FOREIGN PATENT DOCUMENTS

| | | |
|---|---|---|
| JP | 2015-520301 A | 7/2015 |
| JP | 6053230 B2 | 12/2016 |

* cited by examiner

SPRAY COATING

TECHNICAL FIELD

The present invention relates to a spray coating, and more particularly, to a spray coating that is disposed on an inner peripheral surface of a cylinder bore of a cylinder block made of aluminum or an aluminum alloy.

BACKGROUND ART

Hitherto, a spray layer having good corrosion resistance and abrasion resistance has been proposed (refer to Patent Document 1). This spray layer contains an iron-based alloy mainly having a composition of martensite, nickel, and a composition in which a nickel equivalent (NiE) and a chromium equivalent (CrE) in the Schaeffler diagram are specified by the following Formulae: (i) $CrE>10$, (ii): $NiE>CrE-9$, and (iii): $NiE<19-0.8 \times CrE$, where the parameters are each based on a total weight.

CITATION LIST

Patent Document

Patent Document 1: Japan Patent No. 6,053,230

SUMMARY OF INVENTION

Technical Problem

However, the spray layer disclosed in Patent Document 1 has the composition mainly containing martensite, and hence has problems of high surface porosity and low seizure resistance.

The present invention has been made in view of such problems with the related art, and an object thereof is to provide a spray coating capable of not only securing good corrosion resistance and abrasion resistance but also reducing surface porosity and increasing seizure resistance.

Solution to Problem

Through extensive studies for achieving this object, the inventors of the present invention have found that the object can be achieved by incorporating, into a spray coating, carbon, nickel, chromium, and silicon by predetermined amounts, a balance that contains iron and inevitable impurities, and predetermined compositions and a predetermined structure. In this way, the inventors have completed the present invention.

Specifically, according to the present invention, there is provided a spray coating that is disposed on an inner peripheral surface of a cylinder bore of a cylinder block made of aluminum or an aluminum alloy,
in which the spray coating contains
0.005% to 0.14% by mass of carbon,
0.01% to 3.0% by mass of nickel
10% to 20.5% by mass of chromium,
0.05% to 1.5% by mass of silicon, and
a balance containing iron and inevitable impurities
in which the spray coating has
a composition that forms a martensite+ferrite (M+F) region in the Schaeffler diagram, and
a composition in which a nickel equivalent (NiE) and a chromium equivalent (CrE) in the Schaeffler diagram satisfy a relationship expressed by the following Formulae $$NiE \leq 0.95 CrE - 8.59, \quad (1):$$

$$NiE \leq 4.1, \text{ and} \quad (2):$$

$$CrE \geq 10, \text{ and} \quad (3):$$

in which the spray coating has a two-phase structure formed of a martensite phase and a ferrite phase.

Advantageous Effects of Invention

The spray coating according to the present invention contains carbon, nickel, chromium, and silicon by the predetermined amounts, the balance containing iron and inevitable impurities, and the predetermined compositions and the predetermined structure. Thus, the spray coating capable of not only securing good corrosion resistance and abrasion resistance but also reducing surface porosity and increasing seizure resistance can be provided.

DESCRIPTION OF THE EMBODIMENTS

Now, spray coatings according to some of embodiments of the present invention are described in detail. Note that, herein, unless otherwise specified, "%" represents a percentage by mass.

First Embodiment

According to a first embodiment of the present invention, there is provided a spray coating that is disposed on an inner peripheral surface of a cylinder bore of a cylinder block made of aluminum or an aluminum alloy. This spray coating contains 0.005% to 0.14% of carbon (C), 0.01% to 3.0% of nickel (Ni), 10% to 20.5% of chromium (Cr), 0.05% to 1.5% of silicon (Si), and a balance containing iron (Fe) and inevitable impurities. This spray coating has a composition that forms a martensite+ferrite (M+F) region in the Schaeffler diagram, and has a composition in which a nickel equivalent (NiE) and a chromium equivalent (CrE) in the Schaeffler diagram satisfy a relationship expressed by the following Formula (1): $NiE \leq 0.95 CrE - 8.59$, Formula (2): $NiE \leq 4.1$, and Formula (3): $CrE \geq 10$. This spray coating has a two-phase structure formed of a martensite phase and a ferrite phase.

Figure 1:
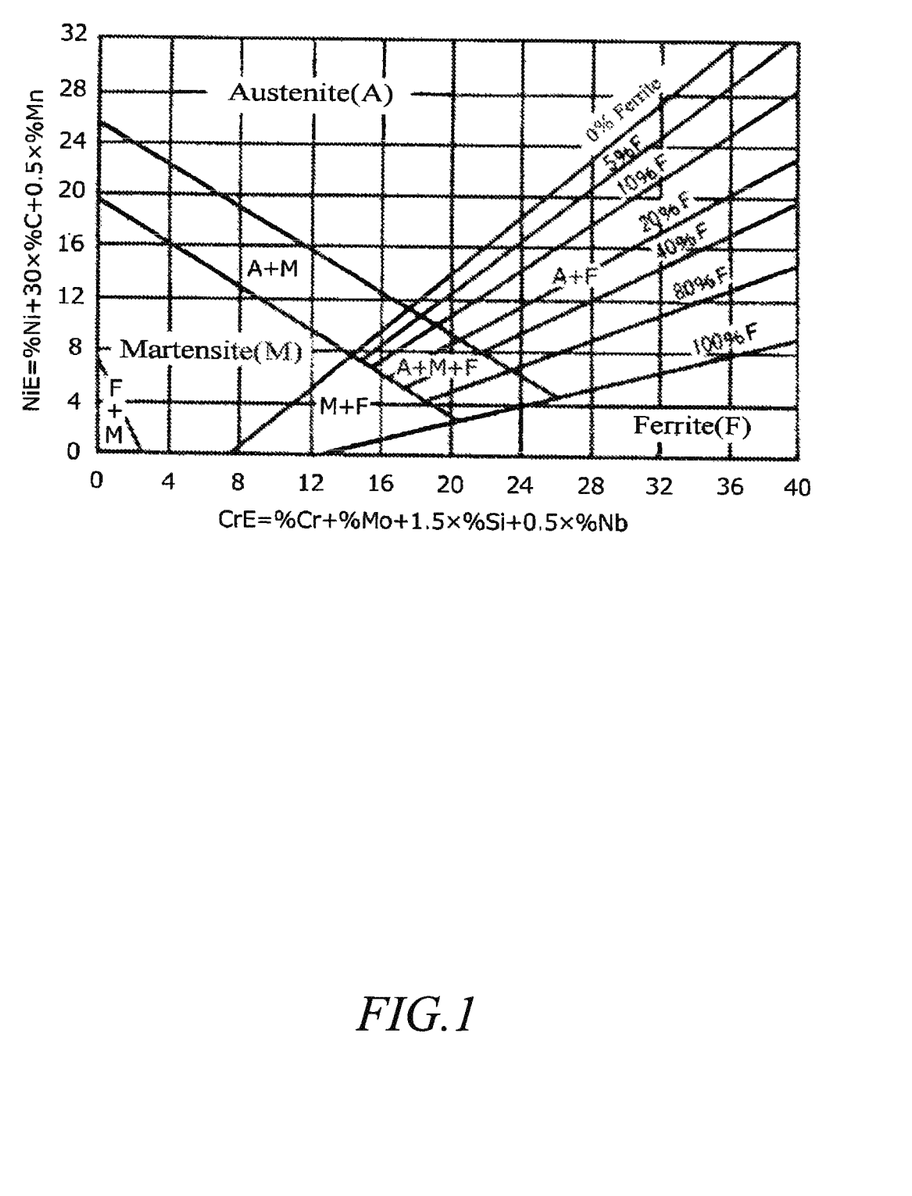
FIG. 1 is the Schaeffler diagram.

In this context, FIG. 1 is the Schaeffler diagram. In the present application, the "martensite+ferrite (M+F) region in the Schaeffler diagram" is a region expressed by the following Formulae (4) to (4''').

$$NiE > 0.3273 CrE - 4.0909 \quad (4)$$

$$NiE < -0.8125 CrE + 19.5 \quad (4')$$

$$NiE > 0 \quad (4'')$$

$$NiE < 1.1228 CrE - 8.4211 \quad (4''')$$

In addition, in the present application, the "nickel equivalent (NiE)" and the "chromium equivalent (CrE)" in the Schaeffler diagram are expressed respectively by the following Formulae (5) and (5').

$$NiE=\% \ Ni+30\times\% \ C+0.5\times\% \ Mn \quad (5)$$

$$CrE=\% \ Cr+\% \ Mo+1.5\times\% \ Si+0.5\times\% \ Nb \quad (5')$$

The spray coating according to this embodiment contains carbon (C), nickel (Ni), chromium (Cr), and silicon (Si) by the predetermined amounts, the balance containing iron (Fe) and inevitable impurities, and the predetermined compositions and the predetermined structure. This probably enables the spray coating according to this embodiment not only to secure good corrosion resistance and abrasion resistance but also to reduce surface porosity and to increase seizure resistance.

Note that, by reducing the surface porosity of the spray coating disposed on the inner peripheral surface of the cylinder bore, consumption of engine oil can be reduced. In addition, by increasing the seizure resistance of the spray coating disposed on the inner peripheral surface of the cylinder bore, adhesion of the cylinder bore and a piston ring can be suppressed.

Further, in the present application, the "good corrosion resistance" refers to corrosion amounts of less than 34 mg as a result of corrosion-resistance evaluation tests described in Examples. These corrosion amounts are each preferably less than 10 mg, more preferably less than 8.5 mg, and much more preferably less than 5 mg. Still further, in the present application, the good "abrasion resistance" refers to abrasion amounts of less than 3.2 μm as a result of abrasion-resistance evaluation tests described in Examples. These abrasion amounts are each preferably less than 2.0 μm, and more preferably less than 1.5 μm. Yet further, in the present application, "good adhesiveness" refers to adhesion strength exceeding 25 MPa as a result of adhesiveness evaluation tests described in Examples. This adhesion strength preferably exceeds 30 MPa, and more preferably exceeds 35 MPa.

Note that, the spray coating according to this embodiment may be described also as follows.

"A spray coating that is disposed on an inner peripheral surface of a cylinder bore of a cylinder block made of aluminum or an aluminum alloy,
  the spray coating containing
    0.005% to 0.14% of carbon,
    0.01% to 3.0% of nickel,
    10% to 20.5% of chromium,
    0.05% to 1.5% of silicon, and
    a balance containing iron and inevitable impurities,
  the spray coating having a composition in which a nickel equivalent (NiE) and a chromium equivalent (CrE) in the Schaeffler diagram satisfy a relationship expressed by the following Formulae (1) to (4), (4') and (4"), $$NiE \leq 0.95CrE-8.59 \quad (1),$$

$$NiE \leq 4.1 \quad (2),$$

$$CrE \geq 10 \quad (3),$$

$$NiE > 0.3273CrE-4.0909 \quad (4),$$

$$NiE < -0.8125CrE+19.5 \quad (4'), \text{ and}$$

$$NiE > 0 \quad (4''),$$

the spray coating having a two-phase structure formed of a martensite phase and a ferrite phase.

First, a base material of the spray coating is described. It is appropriate to employ the aluminum or the aluminum alloy as a constituent material of a cylinder block, and the aluminum alloy is not limited in particular. As a preferred example of the aluminum alloy, there may be mentioned ADC12Z specified as the aluminum-alloy die-casting according to Japanese Industrial Standards (JIS H 5302).

Next, the composition of the spray coating is described.

Carbon (C) is an element that contributes to austenitization of the structure of the spray coating. In addition, such carbon (C) is also an element that is advantageous for increasing hardness of the spray coating. In order that good hardness of the spray coating is secured, a content of carbon (C) in the spray coating needs to be 0.005% or more. Meanwhile, the content of carbon (C) in the spray coating needs also to be 0.14% or less. This is because, when the content of carbon (C) in the spray coating exceeds 0.14%, the surface porosity of the spray coating is high, and the seizure resistance of the spray coating is low.

The content of carbon (C) in the spray coating is more preferably 0.005% or more and 0.13% or less. This is because not only can the good corrosion resistance and the good abrasion resistance be secured, but also the surface porosity can be reduced and the seizure resistance can be increased.

From a viewpoint of a capability to further reduce the surface porosity and to further increase the seizure resistance of the spray coating, the content of carbon (C) in the spray coating is preferably 0.07% or less.

Nickel (Ni) is an element that contributes to the austenitization of the structure of the spray coating. In addition, such nickel (Ni) is also an element that is advantageous for increasing the hardness of the spray coating. In order that the good hardness of the spray coating is secured, a content of nickel (Ni) in the spray coating needs to be 0.01% or more. Meanwhile, the content of nickel (Ni) in the spray coating needs also to be 3.0% or less. This is because, when the content of nickel (Ni) in the spray coating exceeds 3.0%, the two-phase structure formed of the martensite phase and the ferrite phase cannot be formed, and the seizure resistance is low.

The content of nickel (Ni) in the spray coating is more preferably 0.04% or more and 0.61% or less. This is because not only can the good corrosion resistance and the good abrasion resistance be secured, but also the surface porosity can be reduced and the seizure resistance can be increased.

From a viewpoint of a capability to further increase the abrasion resistance and the seizure resistance of the spray coating, the content of nickel (Ni) in the spray coating is preferably 0.6% or less.

Chromium (Cr) is an element that promotes formation of a passive film of the spray coating. In order that the good corrosion resistance of the spray coating is secured, a content of the chromium (Cr) in the spray coating needs to be 10% or more. Meanwhile, the content of chromium (Cr) in the spray coating needs also to be 20.5% or less. This is because, when the content of chromium (Cr) in the spray coating exceeds 20.5%, the two-phase structure formed of the martensite phase and the ferrite phase cannot be formed.

The content of chromium (Cr) in the spray coating is more preferably 10.2% or more and 14.59% or less. This is because not only can the good corrosion resistance and the good abrasion resistance be secured, but also the surface porosity can be reduced and the seizure resistance can be increased.

From a viewpoint of a capability to further increase the corrosion resistance of the spray coating, the content of chromium (Cr) in the spray coating is preferably 11.5% or more. From the viewpoint of the capability to further increase the abrasion resistance and the corrosion resistance of the spray coating, the content of chromium (Cr) in the spray coating is preferably 15.5% or less.

Silicon (Si) is an element that increases the hardness of the spray coating. In order that the good hardness of the spray coating is secured, a content of silicon (Si) in the spray coating needs to be 0.05% or more. Meanwhile, the content of silicon (Si) in the spray coating needs also to be 1.5% or less from a viewpoint of a risk of degradation in processing property as a result of an excessive increase in hardness of the spray coating at a time when the content of silicon (Si) in the spray coating exceeds 1.5%.

The content of silicon (Si) in the spray coating is more preferably 0.1% or more and 0.56% or less. This is because not only can the good corrosion resistance and the good abrasion resistance be secured, but also the surface porosity can be reduced and the seizure resistance can be increased.

From a viewpoint of a capability to increase processing properties of the spray coating, the content of silicon (Si) in the spray coating is preferably 0.5% or less.

Although not limited in particular, the spray coating may contain manganese (Mn) and/or molybdenum (Mo). As a matter of course, a content of manganese (Mn) in the spray coating is preferably as small as possible. In addition, from a viewpoint of cost reduction, a content of molybdenum (Mo) in the spray coating is preferably as small as possible. Thus, the spray coating need not necessarily contain manganese (Mn) or molybdenum (Mo).

The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

Manganese (Mn) is an element that contributes to the austenitization of the structure of the spray coating. In addition, such manganese (Mn) is also an element that is advantageous for increasing the hardness of the spray coating. In order that the good hardness of the spray coating is secured, the content of manganese (Mn) in the spray coating is preferably 1.5% or less, more preferably 1.2% or less, and much more preferably 0.6% or less. Meanwhile, the content of manganese (Mn) in the spray coating is also preferably 0.1% or more, more preferably 0.2% or more, much more preferably 0.3% or more, and particularly preferably 0.4% or more. This is because, when the content of manganese (Mn) in the spray coating is less than 0.1%, the adhesiveness of the spray coating may be degraded.

Molybdenum (Mo) is an element that promotes the formation of the passive film of the spray coating, and that is advantageous for increasing the corrosion resistance of the spray coating. In order that better corrosion resistance of the spray coating is secured, the content of molybdenum (Mo) in the spray coating is preferably 0.01% or more, and more preferably 0.25% or more. Meanwhile, the content of molybdenum (Mo) in the spray coating is also preferably 0.4% or less, more preferably 0.35% or less, much more preferably 0.25% or less, and particularly preferably 0.1% or less. This is because costs of the spray coating can be reduced.

Although not limited in particular, the spray coating may contain niobium (Nb). As a matter of course, a content of niobium (Nb) in the spray coating is preferably as small as possible. Thus, the spray coating need not necessarily contain niobium (Nb).

Niobium (Nb) is an element that is advantageous for increasing the hardness of the spray coating. In addition, in order that the good hardness and the good corrosion resistance of the spray coating are secured, the content of niobium (Nb) in the spray coating is preferably 0.5% or less, more preferably 0.1% to 0.4%, and much more preferably 0.1% to 0.2%.

Although not limited in particular, when a wire-shaped spray material to be used in manufacturing the spray coating has a copper-plating layer on its surface, the spray coating may contain copper (Cu) together with compositions of a core portion of the spray material. A content of copper (Cu) in the spray coating is preferably less than 0.5%.

In addition, the spray coating needs to have the composition that forms the martensite+ferrite (M+F) region in the Schaeffler diagram, specifically, the composition that forms the region expressed by the above-described Formulae (4) to (4′′′). For example, in a martensite (M) region, the surface porosity of the spray coating cannot be reduced. Further, in an austenite+martensite (A+M) region and an austenite+martensite+ferrite (A+M+F) region, the seizure resistance of the spray coating decreases. In particular, when austenite increases as in an austenite (A) region, the adhesiveness of the spray coating is reduced. Still further, in a ferrite (F) region, the good abrasion resistance of the spray coating cannot be secured. Yet further, in a ferrite+martensite (F+M) region, the good corrosion resistance of the spray coating cannot be secured.

In addition, the spray coating needs also to have the composition in which the nickel equivalent (NiE) and the chromium equivalent (CrE) in the Schaeffler diagram satisfy the relationship expressed by the above-described Formulae (1) to (3).

The nickel equivalent (NiE) in the Schaeffler diagram is more preferably 0.38 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 10.4 or more and 15.3 or less in the spray coating. This is because not only can the good corrosion resistance and the good abrasion resistance be secured, but also the surface porosity can be reduced and the seizure resistance can be increased.

If the spray coating has a composition that does not satisfy the relationship expressed by the above-described Formula (1), the surface porosity of the spray coating cannot be reduced. Further, if the spray coating has a composition that does not satisfy the relationship expressed by the above-described Formula (2), the seizure resistance of the spray coating cannot be increased. Still further, if the spray coating has a structure that does not satisfy the relationship expressed by the above-described Formula (3), the spray coating to be formed cannot have the good corrosion resistance.

Next, the structure of the spray coating is described. The spray coating needs to have the two-phase structure formed of the martensite phase and the ferrite phase. If the spray coating does not have such a two-phase structure, the spray coating cannot be reduced in surface porosity or increased in seizure resistance.

From a viewpoint of the capability to secure the good corrosion resistance of the spray coating according to this embodiment, the spray coating preferably has a composition in which the chromium equivalent (CrE) in the Schaeffler diagram satisfies a relationship expressed by the following Formula (3'): CrE≥11.5.

From a viewpoint of a capability to increase the adhesiveness of the spray coating according to this embodiment, the spray coating preferably has a composition in which the nickel equivalent (NiE) in the Schaeffler diagram satisfies a relationship expressed by the following Formula (2'): 0.4≤NiE≤4.1.

From a viewpoint of the capability to further reduce the surface porosity of the spray coating according to this embodiment, the spray coating preferably has a composition in which the nickel equivalent (NiE) and the chromium equivalent (CrE) in the Schaeffler diagram satisfy a relationship expressed by the following Formula (1'): NiE≤0.93 CrE−10.18.

From a viewpoint of the capability to secure better corrosion resistance of the spray coating according to this embodiment, the spray coating preferably contains 11.5% to 20.5% of chromium (Cr), and has the composition in which the chromium equivalent (CrE) in the Schaeffler diagram satisfies a relationship expressed by the following Formula (3'): CrE≥11.5.

From a viewpoint of the capability to secure the better corrosion resistance and better abrasion resistance of the spray coating according to this embodiment, the spray coating preferably contains 11.5% to 15.5% of chromium (Cr), and has a composition in which the chromium equivalent (CrE) in the Schaeffler diagram satisfies a relationship expressed by the following Formula (3"): 11.5≤CrE≤15.5.

From a viewpoint of a capability to increase the adhesiveness and to increase the seizure resistance of the spray coating according to this embodiment, the spray coating preferably contains 0.005% to 0.07% of carbon (C), 0.01% to 0.6% of nickel (Ni), 11.5% to 15.5% of chromium (Cr), 0.05% to 0.5% of silicon (Si), and has a composition in which the nickel equivalent (NiE) in the Schaeffler diagram satisfies a relationship expressed by the following Formula (2"): 0.4≤NiE≤2.3.

From a viewpoint of a capability to increase mass-productivity of the spray coating according to this embodiment, the spray coating preferably has a composition in which the nickel equivalent (NiE) in the Schaeffler diagram satisfies a relationship expressed by 0.60 or more and 0.80 or less, and in which the chromium equivalent (CrE) in the Schaeffler diagram satisfies a relationship expressed by 11.0 or more and 14.5 or less. The spray coating more preferably has a composition in which the nickel equivalent (NiE) in the Schaeffler diagram satisfies a relationship expressed by 0.68 or more and 0.74 or less, and in which the chromium, equivalent (CrE) in the Schaeffler diagram satisfies a relationship expressed by 11.5 or more and 14 or less.

Now, as preferred forms of the present invention, spray coatings according to a second embodiment to a sixth embodiment are cited. Note that, in these second to sixth embodiments, the preferred compositions and the preferred structures in the forgoing first embodiment may be employed as appropriate.

Second Embodiment

According to the second embodiment of the present invention, there is provided a spray coating that is disposed on an inner peripheral surface of a cylinder bore of a cylinder block made of aluminum or an aluminum alloy, the spray coating containing
0.005% to 0.14% of carbon,
0.01% to 3.0% of nickel,
10% to 20.5% of chromium,
0.05% to 1.5% of silicon, and
a balance containing iron and inevitable impurities,
the spray coating having a composition in which a nickel equivalent (NiE) and a chromium equivalent (CrE) in the Schaeffler diagram satisfy a relationship expressed by the following Formulae $$NiE \leq 0.95 CrE - 8.59, \tag{1}$$

$$0.4 \leq NiE \leq 4.1, \tag{2'}$$

$$CrE \geq 10, \tag{3}$$

$$NiE > 0.3273 CrE - 4.0909, \text{ and} \tag{4}$$

$$NiE < -0.8125 CrE + 19.5, \tag{4'}$$

the spray coating having a two-phase structure formed of a martensite phase and a ferrite phase. The spray coating according to this embodiment is not only capable of securing the good corrosion resistance and the good abrasion resistance, but also capable of reducing the surface porosity and increasing the seizure resistance.

The content of carbon (C) in the spray coating is more preferably 0.005% or more and 0.13% or less. This is because not only can the good corrosion resistance and the good abrasion resistance be secured, but also the surface porosity can be reduced and the seizure resistance can be increased. The content of nickel (Ni) in the spray coating is more preferably 0.04% or more and 0.61% or less. This is because not only can the good corrosion resistance and the good abrasion resistance be secured, but also the surface porosity can be reduced and the seizure resistance can be increased. The content of chromium (Cr) in the spray coating is more preferably 10.2% or more and 14.59% or less. This is because not only can the good corrosion resistance and the good abrasion resistance be secured, but also the surface porosity can be reduced and the seizure resistance can be increased. The content of silicon (Si) in the spray coating is more preferably 0.1% or more and 0.56% or less. This is because not only can the good corrosion resistance and the good abrasion resistance be secured, but also the surface porosity can be reduced and the seizure resistance can be increased. The nickel equivalent (NiE) in the Schaeffler diagram is more preferably 0.43 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 10.4 or more and 15.3 or less in the spray coating. This is because not only can the good corrosion resistance and the good abrasion resistance be secured, but also the surface porosity can be reduced and the seizure resistance can be increased. The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

Third Embodiment

According to a third embodiment of the present invention, there is provided a spray coating that is disposed on an inner peripheral surface of a cylinder bore of a cylinder block made of aluminum or an aluminum alloy,
the spray coating containing
0.005% to 0.14% of carbon,
0.01% to 3.0% of nickel,
11.5% to 20.5% of chromium,
0.05% to 1.5% of silicon, and
a balance containing iron and inevitable impurities,
the spray coating having a composition in which a nickel equivalent (NiE) and a chromium equivalent (CrE) in the Schaeffler diagram satisfy a relationship expressed by the following Formulae $$NiE \leq 0.95CrE - 8.59, \quad (1):$$

$$0.4 \leq NiE \leq 4.1, \quad (2'):$$

$$CrE \geq 11.5, \quad (3'):$$

$$NiE > 0.3273CrE - 4.0909, \text{ and} \quad (4):$$

$$NiE < -0.8125CrE + 19.5, \quad (4'):$$

the spray coating having a two-phase structure formed of a martensite phase and a ferrite phase. The spray coating according to this embodiment is capable of achieving corrosion resistance that is better than the corrosion resistance of the spray coating according to the foregoing second embodiment.

The content of carbon (C) in the spray coating is more preferably 0.005% or more and 0.13% or less. This is because not only can the good corrosion resistance and the good abrasion resistance be secured, but also the surface porosity can be reduced and the seizure resistance can be increased. The content of nickel (Ni) in the spray coating is more preferably 0.04% or more and 0.61% or less. This is because not only can the good corrosion resistance and the good abrasion resistance be secured, but also the surface porosity can be reduced and the seizure resistance can be increased. The content of chromium (Cr) in the spray coating is more preferably 11.6% or more and 14.59% or less. This is because not only can the good corrosion resistance and the good abrasion resistance be secured, but also the surface porosity can be reduced and the seizure resistance can be increased. The content of silicon (Si) in the spray coating is more preferably 0.1% or more and 0.56% or less. This is because not only can the good corrosion resistance and the good abrasion resistance be secured, but also the surface porosity can be reduced and the seizure resistance can be increased. The nickel equivalent (NiE) in the Schaeffler diagram is more preferably 0.43 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 11.5 or more and 15.3 or less in the spray coating. This is because not only can the good corrosion resistance and the good abrasion resistance be secured, but also the surface porosity can be reduced and the seizure resistance can be increased. The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

Fourth Embodiment

According to a fourth embodiment of the present invention, there is provided a spray coating that is disposed on an inner peripheral surface of a cylinder bore of a cylinder block made of aluminum or an aluminum alloy,
the spray coating containing
0.005% to 0.14% of carbon,
0.01% to 3.0% of nickel,
11.5% to 20.5% of chromium,
0.05% to 1.5% of silicon, and
a balance containing iron and inevitable impurities,
the spray coating having a composition in which a nickel equivalent (NiE) and a chromium equivalent (CrE) in the Schaeffler diagram satisfy a relationship expressed by the following Formulae $$NiE \leq 0.93CrE - 10.18, \quad (1'):$$

$$0.4 \leq NiE \leq 4.1, \quad (2'):$$

$$CrE \geq 11.5, \quad (3'):$$

$$NiE > 0.3273CrE - 4.0909, \text{ and} \quad (4):$$

$$NiE < -0.8125CrE + 19.5, \quad (4'):$$

the spray coating having a two-phase structure formed of a martensite phase and a ferrite phase. The spray coating according to this embodiment is capable of achieving the corrosion resistance that is better than the corrosion resistance of the spray coating according to the foregoing second embodiment, and is capable of achieving surface porosity that is lower than the surface porosity of the spray coating according to the foregoing second or the foregoing third embodiment.

The content of carbon (C) in the spray coating is more preferably 0.005% or more and 0.13% or less. This is because not only can the good corrosion resistance and the good abrasion resistance be secured, but also the surface porosity can be reduced and the seizure resistance can be increased. The content of nickel (Ni) in the spray coating is more preferably 0.04% or more and 0.61% or less. This is because not only can the good corrosion resistance and the good abrasion resistance be secured, but also the surface porosity can be reduced and the seizure resistance can be increased. The content of chromium (Cr) in the spray coating is more preferably 11.6% or more and 14.59% or less. This is because not only can the good corrosion resistance and the good abrasion resistance be secured, but also the surface porosity can be reduced and the seizure resistance can be increased. The content of silicon (Si) in the spray coating is more preferably 0.1% or more and 0.56% or less. This is because not only can the good corrosion resistance and the good abrasion resistance be secured, but also the surface porosity can be reduced and the seizure resistance can be increased. The nickel equivalent (NiE) in the Schaeffler diagram is more preferably 0.43 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 11.5 or more and 15.3 or less in the spray coating. This is because not only can the good corrosion resistance and the good abrasion resistance be secured, but also the surface porosity can be reduced and the seizure resistance can be increased. The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

Fifth Embodiment

According to a fifth embodiment of the present invention, there is provided a spray coating that is disposed on an inner peripheral surface of a cylinder bore of a cylinder block made of aluminum or an aluminum alloy,
the spray coating containing
0.005% to 0.14% of carbon,
0.01% to 3.0% of nickel,
11.5% to 15.5% of chromium,
0.05% to 1.5% of silicon, and
a balance containing iron and inevitable impurities,
the spray coating having a composition in which a nickel equivalent (NiE) and a chromium equivalent (CrE) in the Schaeffler diagram satisfy a relationship expressed by the following Formulae $$NiE \leq 0.93CrE - 10.18, \quad (1'):$$

$$0.4 \leq NiE \leq 4.1, \quad (2'):$$

$$11.5 \leq CrE \leq 15.5, \text{ and} \quad (3''):$$

$$NiE > 0.3273CrE - 4.0909, \quad (4):$$

the spray coating having a two-phase structure formed of a martensite phase and a ferrite phase. The spray coating according to this embodiment is capable of achieving the corrosion resistance that is better than the corrosion resistance of the spray coating according to the foregoing second embodiment, and is capable of achieving the surface porosity that is lower than the surface porosity of the spray coating according to the foregoing second or the foregoing third embodiment. In addition, the spray coating according to this embodiment is capable of achieving abrasion resistance that is higher than the abrasion resistance of the spray coatings according to the foregoing second to the foregoing fourth embodiments.

The content of carbon (C) in the spray coating is more preferably 0.005% or more and 0.13% or less. This is because not only can the good corrosion resistance and the good abrasion resistance be secured, but also the surface porosity can be reduced and the seizure resistance can be increased. The content of nickel (Ni) in the spray coating is more preferably 0.04% or more and 0.61% or less. This is because not only can the good corrosion resistance and the good abrasion resistance be secured, but also the surface porosity can be reduced and the seizure resistance can be increased. The content of chromium (Cr) in the spray coating is more preferably 11.6% or more and 14.59% or less. This is because not only can the good corrosion resistance and the good abrasion resistance be secured, but also the surface porosity can be reduced and the seizure resistance can be increased. The content of silicon (Si) in the spray coating is more preferably 0.1% or more and 0.56% or less. This is because not only can the good corrosion resistance and the good abrasion resistance be secured, but also the surface porosity can be reduced and the seizure resistance can be increased. The nickel equivalent (NiE) in the Schaeffler diagram is more preferably 0.43 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 11.5 or more and 15.3 or less in the spray coating. This is because not only can the good corrosion resistance and the good abrasion resistance be secured, but also the surface porosity can be reduced and the seizure resistance can be increased. The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

Sixth Embodiment

According to a sixth embodiment of the present invention, there is provided a spray coating that is disposed on an inner peripheral surface of a cylinder bore of a cylinder block made of aluminum or an aluminum alloy,
the spray coating containing
0.005% to 0.07% of carbon,
0.01% to 0.6% of nickel,
11.5% to 15.5% of chromium,
0.05% to 0.5% of silicon, and
a balance containing iron and inevitable impurities,
the spray coating having a composition in which a nickel equivalent (NiE) and a chromium equivalent (CrE) in the Schaeffler diagram satisfy a relationship expressed by the following Formulae $$NiE \leq 0.93CrE - 10.18, \quad (1'):$$

$$0.4 \leq NiE \leq 4.1, \quad (2'):$$

$$11.5 \leq CrE \leq 15.5, \text{ and} \quad (3''):$$

$$NiE > 0.3273CrE - 4.0909, \quad (4):$$

the spray coating having a two-phase structure formed of a martensite phase and a ferrite phase. The spray coating according to this embodiment is capable of achieving the corrosion resistance that is better than the corrosion resistance of the spray coating according to the foregoing second embodiment, and is capable of achieving the surface porosity that is lower than the surface porosity of the spray coating according to the foregoing second or the foregoing third embodiment. In addition, the spray coating according to this embodiment is capable of achieving abrasion resistance that is higher than the abrasion resistance of the spray coatings according to the foregoing second to the foregoing fourth embodiments, and is capable of achieving seizure resistance that is higher than the seizure resistance of the spray coatings according to the foregoing second to the foregoing fifth embodiments.

The content of carbon (C) in the spray coating is more preferably 0.005% or more and 0.07% or less. This is because not only can the good corrosion resistance and the good abrasion resistance be secured, but also the surface porosity can be reduced and the seizure resistance can be increased. The content of nickel (Ni) in the spray coating is more preferably 0.04% or more and 0.53% or less. This is because not only can the good corrosion resistance and the good abrasion resistance be secured, but also the surface porosity can be reduced and the seizure resistance can be increased. The content of chromium (Cr) in the spray coating is more preferably 11.6% or more and 14.59% or less. This is because not only can the good corrosion resistance and the good abrasion resistance be secured, but also the surface porosity can be reduced and the seizure resistance can be increased. The content of silicon (Si) in the spray coating is more preferably 0.1% or more and 0.45% or less. This is because not only can the good corrosion resistance and the good abrasion resistance be secured, but also the surface porosity can be reduced and the seizure resistance can be increased. The nickel equivalent (NiE) in the Schaeffler diagram is more preferably 0.43 or more and 4.1 or less in the spray coating. This is because not only can the good corrosion resistance and the good abrasion resistance be secured, but also the surface porosity can be reduced and the seizure resistance can be increased. The chromium equivalent (CrE) in the Schaeffler diagram is more preferably 11.5 or more and 15.3 or less in the spray coating. This is because not only can the good corrosion resistance and the good abrasion resistance be secured, but also the surface porosity can be reduced and the seizure resistance can be increased. The content of manganese (Mn) in the spray coating is more preferably 0.2% or more and 1.2% or less. This is because not only can the good corrosion resistance and the good abrasion resistance be secured, but also the surface porosity can be reduced and the seizure resistance can be increased. The content of molybdenum (Mo) in the spray coating is more preferably 0.01% or more and 0.34% or less. This is because not only can the good corrosion resistance and the good abrasion resistance be secured, but also the surface porosity can be reduced and the seizure resistance can be increased.

An example of methods of manufacturing the above-described spray coatings is described. Note that, the spray coatings according to the present invention is not limited to those to be formed by such manufacturing methods.

First, the cylinder block made of the aluminum alloy is prepared, for example, by casing the aluminum alloy into the cylinder block. Then, when necessary, surface-roughening groundwork is performed on the inner peripheral surface of the cylinder bore. Next, the cylinder block is preheated, and in this state, droplet powder obtained by transforming a spray material into droplets with use of an arc current is scattered onto the inner peripheral surface of the cylinder bore. In this way, the spray coating is formed on the inner peripheral surface of the cylinder bore.

EXAMPLES

Now, the present invention is described in more detail by way of Examples.

However, the present invention is not limited to these Examples.

Example 1

Formation of Spray Material

In a melting furnace, in order that the core portion of the spray material contained 0.009% of carbon (C), 0.35% of manganese (Mn), 0.22% of nickel (Ni), 12.34% of chromium (Cr), 0.09% of molybdenum (Mo), and 0.42% of silicon (Si), carbon (C), manganese (Mn), nickel (Ni), chromium (Cr), molybdenum (Mo), and silicon (Si) were added to iron (Fe). Then, this compositionally controlled melt was formed into a copper rod (diameter of 9 mm) by blooming. Next, cold drawing was repeated on this resultant copper rod. In this way, the wire-shaped spray material (diameter of 3 min) was formed. After that, the resultant wire-shaped spray material was copper-plated in lots of a length of 20 m by being immersed into a copper sulfate solution at a liquid temperature of 40° C., a voltage of 5 V, and a current density of 4 $A/dm^2$ until a thickness of a copper-plating layer reached 0.6 µm. In this way, a spray material of this Example was formed. The energization was performed for approximately 20 minutes.

Note that, the "thickness of a copper-plating layer" was measured by the plating-thickness test method according to Japanese Industrial Standards (JIS H8501).

Formation of Spray Coating

The cylinder block made of the aluminum alloy was formed by casting, and the groundwork was performed on the inner peripheral surface of the cylinder bore such that the adhesiveness of the spray coating was increased. In this way, a cylinder-block base used in this Example was prepared. Then, the prepared cylinder-block base was preheated to 120° C., and in this state, while moving a spray gun from one end side to another end side by using a spray machine (twin-arc wire spray machine produced by HELLA GmbH & Co. KGaA) with the spray gun having been inserted in the cylinder bore, droplets of the spray material of this Example were molten by arcs at a tip of the spray gun, and sprayed as a spray flame onto the inner peripheral surface of the cylinder bore until a thickness of the spray coating reached 300 µm. In this way, the spray coating of this Example was formed. Note that, the following procedure demonstrated that the spray coating of this Example had the two-phase structure formed of the martensite phase and the ferrite phase. Table 1 shows a part of specifications of the spray coating of this Example.

Observation of Metal Structure

The spray coating of this Example was cut out as a spray-coated cylinder block (length of 20 mm×width of 20 mm×thickness of 5 mm), and a metal structure of a cut surface of a part corresponding to the cut-out spray coating was observed under a scanning electron microscope (SEM).

Example 2 to Example 8 and Comparative Example 1 to Comparative Example 9

Spray coatings of other Examples were formed by repeating the processes that are the same as those in Example 1 except that the contents of carbon (C), manganese (Mn), nickel (Ni), chromium (Cr), molybdenum (Mo), and silicon (Si) in forming the spray material were changed to values shown in Table 1 and Table 2, and that amounts of the changes were adjusted by changing the content of iron (Fe). Table 1 and Table 2 show parts of specifications of the spray coatings of the other Examples.

TABLE 1

|  |  | Example 1 | Example 2 | Example 3 | Example 4 | Example 5 | Example 6 | Example 7 | Example 8 |
|---|---|---|---|---|---|---|---|---|---|
| Composition | C (%) | 0.009 | 0.009 | 0.005 | 0.13 | 0.07 | 0.01 | 0.006 | 0.005 |
|  | Mn (%) | 0.35 | 0.38 | 1.2 | 0.22 | 0.4 | 0.2 | 0.23 | 0.24 |
|  | Ni (%) | 0.22 | 0.61 | 0.53 | 0.12 | 0.04 | 0.1 | 0.13 | 0.11 |
|  | Cr (%) | 12.34 | 12.42 | 11.32 | 14.59 | 11.2 | 10.2 | 13.2 | 11.6 |
|  | Mo (%) | 0.09 | 0.07 | 0.12 | 0.34 | 0.09 | 0.01 | 0.08 | 0.04 |
|  | Si (%) | 0.42 | 0.35 | 0.56 | 0.24 | 0.12 | 0.1 | 0.32 | 0.45 |
|  | CrE (—) | 13.1 | 13.0 | 12.3 | 15.3 | 11.5 | 10.4 | 13.8 | 12.3 |
|  | NiE (—) | 0.7 | 1.1 | 1.3 | 4.1 | 2.3 | 0.5 | 0.43 | 0.38 |
| Structure |  | M + F[1] | M + F | M + F | M + F | M + F | M + F | M + F | M + F |
| Performance Evaluation | Surface Porosity (area %) | 1.05 | 1.7 | 2.3 | 2.4 | 2.7 | 0.9 | 1.2 | 1.1 |
|  | Seizure Load (N) | 1500 | 1500 | 1500 | 1000 | 1500 | 1500 | 1500 | 1500 |
|  | Corrosion Amount (mg) | 2.9 | 2.7 | 3.4 | 2.0 | 4.2 | 8.5 | 2.3 | 3.4 |
|  | Abrasion Amount (μm) | 0.5 | 0.4 | 0.5 | 0.5 | 0.7 | 0.4 | 1.9 | 0.4 |
|  | Adhesion Strength (MPa) | 34.6 | 35.4 | 37.6 | 38.9 | 40.0 | 35.4 | 37.6 | 25.6 |

[1]Having two-phase structure formed of martensite phase and ferrite phase.

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Composition | C (%) | 0.11 | 0.1 | 0.11 | 0.32 | 0.01 | 0.1 | 0.11 | 0.011 | 0.085 |
|  | Mn (%) | 0.4 | 1 | 2.7 | 0.53 | 0.3 | 1.64 | 2.3 | 3.31 | 0.82 |
|  | Ni (%) | 0.54 | 0.1 | 1.9 | 0.48 | 0.21 | 8.6 | 13.56 | 3.96 | 0.2 |
|  | Cr (%) | 0.23 | 11.5 | 11.9 | 12.5 | 16.38 | 30.74 | 23.4 | 14.9 | 9.51 |
|  | Mo (%) | 0 | 0.2 | 0.09 | 0.08 | 0 | 0 | 2.17 | 0 | 0 |
|  | Si (%) | 0.54 | 0.66 | 0.13 | 0.49 | 0.28 | 0.48 | 0.41 | 0.29 | 0.06 |
|  | CrE (—) | 1.0 | 12.7 | 12.2 | 13.3 | 16.8 | 31.5 | 26.2 | 15.3 | 9.6 |
|  | NiE (—) | 4.0 | 3.6 | 6.6 | 10.3 | 0.7 | 12.4 | 18.0 | 5.9 | 3.2 |
| Structure |  | F + M[1] | M + F[2] | M + F | M + F | F[3] | A + F[4] | A + F | M + F | M + F |
| Performance Evaluation | Surface Porosity (area %) | — | 3.6 | 5.3 | 9.6 | 1.2 | — | — | 2.9 | 3.3 |
|  | Seizure Load (N) | 1100 | 1100 | 700 | 500 | 1500 | 400 | 400 | 700 | 1100 |
|  | Corrosion Amount (mg) | 285 | 1.2 | 3.4 | 2.8 | — | — | — | 2.1 | 34 |
|  | Abrasion Amount (μm) | — | 0.5 | 0.5 | 0.4 | 3.2 | — | — | 0.6 | 0.6 |
|  | Adhesion Strength (MPa) | 38.9 | 40.0 | 35.4 | 37.6 | 38.9 | 0.0 | 0.0 | 41.2 | 40.3 |

[1]Having two-phase structure formed of ferrite phase and martensite phase
[2]Having two-phase structure formed of martensite phase and ferrite phase
[3]Having structure formed of martensite phase
[4]Having two-phase structure formed of austenite phase and ferrite phase Surface Porosity The respective spray coatings of the other Examples were cut out as the spray-coated cylinder blocks (length of 20 mm×width of 20 mm×thickness of 5 mm). Then, a surface of a part corresponding to each of the cut-out spray coatings was observed under an optical microscope, and a taken micrograph was converted into numerals, specifically, binarized through image analysis. Obtained results are shown both in Table 1 and Table 2.

Seizure-Resistance Evaluation Tests

The respective spray coatings of the other Examples were cut out as spray-coated cylinder blocks (length of 45 mm×width of 20 mm×thickness of 5 mm), and were used as respective spray-coated cylinder-block test pieces of the other Examples. Meanwhile, respective hard-carbon-filmed piston-ring test pieces (length of 3 mm×width of 15 mm) of the other Examples were cut out from a piston ring having a surface on which a hard carbon film with a surface roughness Ra of 0.1 μm or less was formed. Then, the respective spray-coated cylinder-block test pieces of the other. Examples were fixed to a reciprocal table, and the respective hard-carbon-filmed piston-ring test pieces of the other Examples were fixed to a vertically movable head. In this way, the hard carbon films were brought into contact with the spray coatings. Next, by reciprocating the table, the respective spray-coated cylinder-block test pieces of the other Examples and the respective spray-coated cylinder-block test pieces of the other Examples were slid relative to each other under the following condition while changing loads on the spray coatings. In this way, seizure loads were measured. Note that, at that time, sliding temperatures were also measured with a thermocouple attached to each of the respective hard-carbon-filmed piston-ring test pieces of the other Examples. Obtained results are shown both in Table 1 and Table 2.

Testing Condition

Table Moving Speed: 1 m/s

Step Load: 100 N/step

Reciprocating Sliding Distance: 20 mm

Used Lubricating Oil: Poly-α-olefin (PAO) with Kinematic Viscosity of 4 cSt at 100° C.

Amount of Used Lubricating Oil: One Droplet Was Applied

Table-Side Heating Temperature: 120° C.

Test Stop Condition: Frictional-Force Limiter Was Set to Be Activated If Frictional Force Continued to Exceed 120 N.

Corrosion-Resistance Evaluation Tests

The respective spray coatings of the other Examples were cut out as spray-coated cylinder blocks (length of 10 mm×width of 10 mm×thickness of 5 mm). Then, in order that corrosion of parts other than surfaces of the spray coatings was suppressed, the parts other than the surfaces of the spray coatings were coated, and then weights were measured. Next, the spray coatings were immersed in a 1% solution of nitric acid for one hour, and then the weights are measured again. After that, corrosion amounts were calculated from changes in weight before and after the immersion. Obtained results are shown both in Table 1 and Table 2.

Abrasion-Resistance Evaluation Tests

The respective spray coatings of the other Examples were cut out as spray-coated cylinder blocks (length of 15 mm×width of 20 mm×thickness of 5 mm), and were used as respective spray-coated cylinder-block test pieces of the other Examples. Meanwhile, respective hard-carbon-filmed piston-ring test pieces (length of 3 mm×width of 15 mm) of the other Examples were cut out from the piston ring having the surface on which the hard carbon film with the surface roughness Ra of 0.1 μm or less was formed. These pieces were slide under the following condition, and abrasion depths were measured. Obtained results are shown both in Table 1 and Table 2.

Testing Condition

Temperature: Room Temperature (25° C.)

Load: 300 N

Amplitude: 3 mm

Frequency: 25 Hz

Test Period: 60 minutes

Used Lubricating Oil: Poly-α-olefin (PAO) with Kinematic Viscosity of 4 cSt at 100° C.

Figure 2:
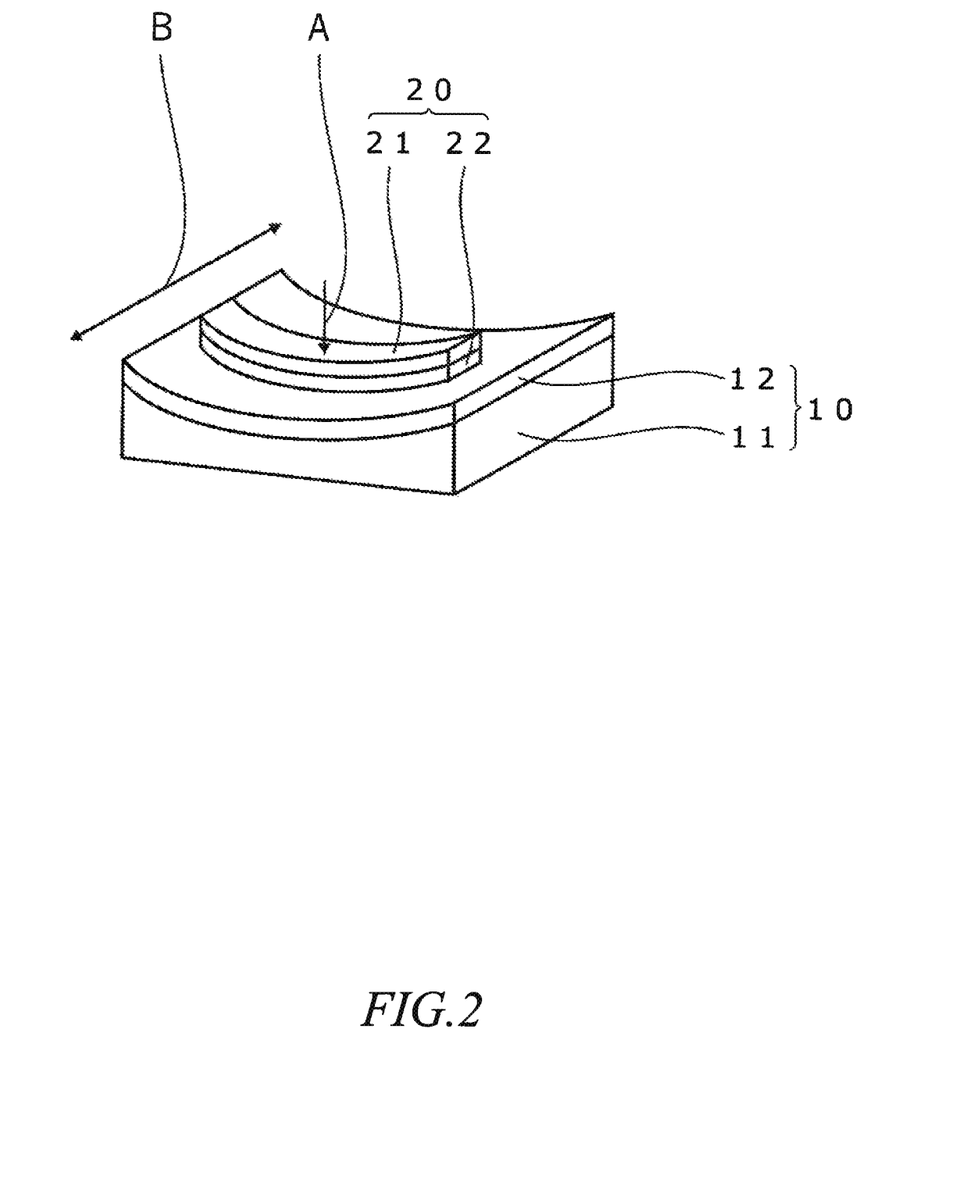
FIG. 2 is an explanatory perspective view illustrating an outline of abrasion-resistance evaluation tests.

FIG. 2 is an explanatory perspective view illustrating an outline of the abrasion-resistance evaluation tests. As illustrated in FIG. 2, a hard-carbon-filmed piston-ring test piece 20 formed of a piston-ring base 21 and a hard carbon film 22 is set on a spray-coated cylinder-block test piece 10 formed of a cylinder-block base 11 and a spray coating 12. An arrow A indicates a direction of a load to be applied in the abrasion-resistance evaluation tests (direction from top to bottom), and arrows B indicate a direction in which the hard-carbon-filmed piston-ring test piece 20 slides on a surface of the spray-coated cylinder-block test piece 10 (horizontal direction).

Adhesion-Strength Evaluation Tests

The respective spray coatings of the other Examples were cut out as spray-coated cylinder blocks (length of 40 mm×width of 80 mm×thickness of 5 mm). Then, a test jig was bonded to the surface of each of the spray coatings with use of an adhesive. Next, in a procedure of pushing in the test jig with use of an AUTOGRAPH and peeling a bonded portion from each of the spray coatings, a stress-strain curve was obtained, and maximum-possible stress that does not cause the spray coatings to start to be peeled was calculated as the adhesion strength (MPa). Obtained results are shown both in Table 1 and Table 2.

Table 1 demonstrates that, in Example 1 to Example 8 in the scope of the present invention, not only were corrosion resistance and abrasion resistance that are better than those in Comparative Example 1 to Comparative Example 9 out of the scope of the present invention successfully secured, but also the surface porosity was successfully reduced to be lower and the seizure resistance was successfully increased to be higher than those in Comparative Example 1 to Comparative Example 9 out of the scope of the present invention. Specifically, in Example 1 to Example 8 in the scope of the present invention, the surface porosities each decreased to less than 2.8 area %, and the seizure loads being indices of the seizure resistance each increased to exceed 700 N. This is probably because the spray coatings of Example 1 to Example 8 contain 0.005% to 0.14% of carbon (C), 0.01% to 3.0% of nickel (Ni), 10% to 20.5% of chromium (Cr), 0.05% to 1.5% of silicon (Si), and the balance containing iron and inevitable impurities. This is also probably because the spray coatings of Example 1 to Example 8 have the compositions each of which forms the martensite±ferrite (M+F) region in the Schaeffler diagram, have the compositions in each of which the nickel equivalent (NiE) and the chromium equivalent (CrE) in the Schaeffler diagram satisfy the relationship expressed by Formula (1): NiE≤0.95 CrE−8.59, Formula (2): NiE≤4.1, and Formula (3): CrE≥10, and each have the two-phase structure formed of the martensite phase and the ferrite phase.

At present, probably, the results obtained in Example 1 are the best.

The present invention is not limited to the some of the embodiments and Examples described hereinabove, and various modifications may be made thereto within the gist of the present invention.

REFERENCE SIGNS LIST

10 Spray-coated cylinder-block test piece
11 Cylinder-block base
12 Spray coating
20 Hard-carbon-filmed piston-ring test piece
21 Piston-ring base
22 Hard carbon film

The invention claimed is:

1. A cylinder block comprising:
a cylinder bore having an inner peripheral surface; and
a spray coating disposed on the inner peripheral surface of the cylinder bore; wherein:
the cylinder block is made of aluminum or an aluminum alloy;
the spray coating contains:
0.005% to 0.07% by mass of carbon,
0.01% to 3.0% by mass of nickel, 10% to 15.5% by mass of chromium,
0.05% to 1.5% by mass of silicon, and
a balance containing iron and inevitable impurities;
the spray coating has a composition that forms a martensite+ferrite region in a Schaeffler diagram, and in which a nickel equivalent (NiE) and a chromium equivalent (CrE) in the Schaeffler diagram satisfy a relationship expressed by the following Formulae (1) to (3)

$$NiE \leq 0.95 CrE - 8.59 \quad (1),$$

$$NiE \leq 4.1 \quad (2), \text{ and}$$

$$CrE \geq 10 \quad (3);$$

the spray coating has a two-phase structure formed of a martensite phase and a ferrite phase; and
the spray coating has a surface porosity of 2.7% or less.

2. The cylinder block according to claim 1, wherein the spray coating has a composition in which the chromium equivalent (CrE) in the Schaeffler diagram satisfies a relationship expressed by the following Formula (3')

$$CrE \geq 11.5 \quad (3').$$

3. The cylinder block according to claim 1, wherein the spray coating has a composition in which the nickel equivalent (NiE) in the Schaeffler diagram satisfies a relationship expressed by the following Formula (2')

$$0.4 \leq NiE \leq 4.1 \quad (2').$$

4. The cylinder block according to claim 1, wherein the spray coating has a composition in which the nickel equivalent (NiE) and the chromium equivalent (CrE) in the Schaeffler diagram satisfy a relationship expressed by the following Formula (1')

$$NiE \leq 0.93 CrE - 10.18 \quad (1').$$

5. The cylinder block according to claim 1, wherein the spray coating contains 11.5% to 15.5% by mass of chromium, and has a composition in which the chromium equivalent (CrE) in the Schaeffler diagram satisfies a relationship expressed by the following Formula (3')

$$CrE \geq 11.5 \quad (3').$$

6. The cylinder block according to claim 1, wherein the spray coating contains 11.5% to 15.5% by mass of chromium, and has a composition in which the chromium equivalent (CrE) in the Schaeffler diagram satisfies a relationship expressed by the following Formula (3")

$$11.5 \leq CrE \leq 15.5 \quad (3'').$$

7. The cylinder block according to claim 1, wherein the spray coating contains 0.005% to 0.07% by mass of carbon, 0.01% to 0.6% by mass of nickel, 11.5% to 15.5% by mass of chromium, 0.05% to 0.5% by mass of silicon; and has a composition in which the nickel equivalent (NiE) in the Schaeffler diagram satisfies a relationship expressed by the following Formula (2")

$$0.4 \leq NiE \leq 2.3 \quad (2'').$$

8. The cylinder block according to claim 1, wherein the spray coating further contains manganese and/or molybdenum.

9. The cylinder block according to claim 1, wherein the spray coating further comprises 0.2% to 1.2% by mass of manganese and 0.01% to 0.34% by mass of molybdenum.

10. The cylinder block according to claim 1, wherein the surface porosity is in a range of 1.05% to 2.7%.

* * * * *